(12) United States Patent
Jones

(10) Patent No.: US 6,732,030 B2
(45) Date of Patent: May 4, 2004

(54) THREE-DIMENSIONAL MAPPING SYSTEMS FOR AUTOMOTIVE VEHICLES AND OTHER ARTICLES

(75) Inventor: Barbara L. Jones, Norfolk (GB)

(73) Assignee: Snap-on U.K. Holdings Limited, Norfolk (GB)

( * ) Notice: Subject to any disclaimer, the term of this patent is extended or adjusted under 35 U.S.C. 154(b) by 0 days.

(21) Appl. No.: 10/219,733

(22) Filed: Aug. 15, 2002

(65) Prior Publication Data

US 2003/0036830 A1 Feb. 20, 2003

(30) Foreign Application Priority Data

Aug. 18, 2001 (GB) .............................. 01020277

(51) Int. Cl.$^7$ .............................. G01S 5/30; G01B 21/20
(52) U.S. Cl. ........................................ 701/33; 702/168
(58) Field of Search ..................... 701/29, 33; 356/511, 356/516; 702/167, 168; 700/56, 66

(56) References Cited

U.S. PATENT DOCUMENTS

| | | | |
|---|---|---|---|
| 4,811,250 A | * 3/1989 | Steber et al. ............... 702/152 |
| 5,054,207 A | * 10/1991 | Marshall ..................... 33/600 |
| 5,278,423 A | 1/1994 | Wangler et al. | |
| 5,321,490 A | 6/1994 | Olson et al. | |
| 5,341,575 A | * 8/1994 | Chisum ...................... 33/608 |
| 5,561,526 A | 10/1996 | Huber et al. | |
| 5,589,942 A | 12/1996 | Gordon | |
| RE35,816 E | 6/1998 | Schulz | |
| 5,767,913 A | 6/1998 | Kassatly | |
| 5,852,672 A | 12/1998 | Lu | |
| 5,870,101 A | 2/1999 | Murata et al. | |
| 5,913,170 A | 6/1999 | Wortham | |
| 6,006,021 A | 12/1999 | Tognazzini | |
| 6,052,607 A | 4/2000 | Edwards et al. | |
| 6,115,927 A | 9/2000 | Hendrix | |
| 6,130,641 A | 10/2000 | Kraeutner et al. | |
| 6,160,910 A | 12/2000 | Freifeld | |
| 6,236,743 B1 | 5/2001 | Pratt | |
| 6,285,320 B1 | 9/2001 | Olster et al. | |
| 6,288,385 B1 | 9/2001 | Miramonti et al. | |
| 6,304,321 B1 | 10/2001 | Wangler et al. | |
| 2002/0152040 A1 | 10/2002 | Majoe | |

FOREIGN PATENT DOCUMENTS

| | | | |
|---|---|---|---|
| DE | 44 17 864 A1 | * 11/1995 |
| JP | 03-235017 | * 10/1991 |
| JP | 63-188706 | * 8/1998 |
| WO | WO 99/36216 | 7/1999 |
| WO | WO 99/56146 | 11/1999 |

* cited by examiner

*Primary Examiner*—Michael J. Zanelli
(74) *Attorney, Agent, or Firm*—Seyfarth Shaw LLP

(57) ABSTRACT

Method and apparatus for three-dimensional mapping for automotive diagnostics and repair and other uses enables mapping of separate regions of a vehicle with a linking mapping step between the apparatus used for mapping the two regions, the linking mapping step using the transmission of an energy signal between the two sets of apparatus to establish their relative three-dimensional coordinates.

15 Claims, 1 Drawing Sheet

THREE-DIMENSIONAL MAPPING SYSTEMS FOR AUTOMOTIVE VEHICLES AND OTHER ARTICLES

BACKGROUND

This application relates to three dimensional mapping systems for automotive vehicles and other articles. More specifically, but not exclusively, the application describes a method and apparatus applicable to diagnostics and repair operations in relation to automotive vehicles and other articles and providing improved means for the mapping of both upper regions and lower regions (or indeed any two or more regions) of a motor vehicle.

Requirements for the mapping of the upper regions of a motor vehicle arise generally in relation to crash repair operations. More specifically, a requirement for convenient and accurate mapping of a vehicle's super-structure arises in relation to the use of folding structures in convertible automobiles, particularly where the folding structure is rigid or semi-rigid, thus requiring exact matching of its structure in relation to corresponding portions of the vehicle super-structure.

Of course it is entirely possible to carry out the mapping of the upper portion of the vehicle as an independent operation, utilizing, if suitably adaptable, the mapping equipment used for the underside of the vehicle. However, in the diagnostics and crash repair field where mapping time is of the essence, it is an important functional selling point for mapping equipment manufacturers to be able to offer a system having the capability of carrying out the upper and lower mapping operations in an integrated or sequential way in which the upper mapping steps would (for example) be carried out immediately after completing the lower mapping operation, and preferably with a minimum of interruption of the sequence of coordinate-reading steps.

The difficulty in continuing a 3-dimensional mapping operation between upper and lower portions of a vehicle or similar structure arises from the fact that the energy emission or transmission devices employed in the mapping operation for one portion of the vehicle do not readily permit the continuation of the mapping operation from one portion of the vehicle into the other due to the differences of pure "geography" in terms of the aspect of the relevant surfaces and structures whereby energy signal transmission via a simple direct path (as is preferred for straightforward mapping operations) can occur.

One approach to this problem has been proposed in WO 99/56146 (in the name of ISE/Globaljig) which proposes the mapping of three intermediate or side locations on the vehicle as a means for transferring the coordinates of measurement or reference between the two portions of the vehicle to be mapped. Such an approach can be made to work with care, but it requires a careful choice of location for the signal receiver or transmitter which carries out the mapping steps for it to be able to exchange signals with the transmitters or receivers at the intermediate locations, not to mention the difficulties of mounting the transfer signal generators (or receivers) on a side or intermediate portion of the vehicle, which may not be convenient unless some magnetic or the like system for mounting is adopted. There is also the need for these transfer signal generators (or receivers) to be visible (in terms of reasonably direct signal transmission to the signal receiver) throughout both the mapping operation for the upper and for the lower portion of the vehicle, and this can impose significant constraints.

WO 99/36216 (Perceptron) discloses a robot-based non-contact gauging system for vehicle manufacture in which a target structure, including a three-dimensional framework, is used for re-calibration purposes when the robotic system has been bumped or jarred.

SUMMARY

It will be appreciated from the foregoing that some significant improvements are needed in this area and it is an object to provide a method and apparatus offering improvements in this respect.

It has been discovered that a straightforward approach can be adopted to the co-ordinate transfer requirement, which eliminates the need to mount on the vehicle, or other object to be mapped, a set of emitters or receivers to serve as a co-ordinate transfer device, and which are "visible" (in terms of effective energy signal transmission) in both the upper and lower (or other) mapping region operations.

Instead of providing signal emitting means at an intermediate location enabling the establishment for both mapping operations of a fixed, and well defined location which appears in the results of both mapping operations so that, effectively, they overlap, means is provided for causing the actual transfer at a chosen time (which can be chosen quite freely) of an energy signal between two mapping systems in a manner such that the signal transmission between the systems itself establishes their relative dispositions in space, or their relative coordinates.

Thus, in accordance with this approach, all that is required for such relative coordinate establishment is the provision of means for the transmission of an energy signal between the two mapping operations (upper and lower or other relative dispositions). For the purpose, it will be appreciated that there is a need to provide, for the purpose of the relatively instantaneous transmission of the coordinate relationship-establishing energy signal, of twin or dual energy transfer components such as signal emitters or receptors, between which the energy signal is transmitted. Likewise, since such signal transmission and reception will involve an emitter/receiver pair, there will usually be provided a pair of one such (emitter or receiver) and at least one such (receiver or emitter) of the other kind. In this way the coordinate transfer step can be performed relatively very quickly and easily at a chosen and convenient point in the overall task of carrying out the two sets of mapping operations. Moreover, the energy transmission step between the two mapping operation systems is carried out relatively very quickly. Indeed, the energy signal transmission itself is of course substantially instantaneous and does not require that the means for transmitting that energy signal (for example an emitter or a receiver) be mounted at a defined and carefully chosen location on the article to be mapped. Thus, in one case (for example), the energy signal is transmitted between receiver means for the upper vehicle region and receiver means for the lower vehicle region and, thus, the energy signal transfer means is itself energy emitter means, which can be a single item of such emitter apparatus which is adapted to transmit simultaneous signals to both such sets of receiver apparatus, then this emitter apparatus can be a simple hand-held device with energy emitter means at known spacings along its length and adapted to emit signals for convenient reception by the twin or dual receiver means.

In another case, the energy signal is transmitted in the opposite direction and twin or dual emitter assemblies are provided for the upper and lower (or other) mapping regions, and in such a system it will be understood that the individual mapping steps in the upper and lower mapping regions are performed by the transmission of energy from those same dual energy emitters to receivers at the locations to be mapped, or indeed to a wand-type hand-held device which is manually located at the locations to be mapped in a sequence of mapping steps.

Thus it can be seen that, in accordance with the disclosed embodiments, the upper and lower mapping operations, or more generally the two mapping regional operations, can be carried out quite independently of each other and in any desired sequence of steps. In order to inter-relate the mapping coordinates (in order that these can be evaluated in relation to manufacturer's data or pre-crash mapping data, or otherwise), all that is required is to set up the arrangement for the transmission of the energy signal between the two systems. This will usually require no more than the hand-holding of (for example) an energy signal transmission unit which transmits such energy signal instanteously (for example on actuation of a push button). This can be done without the need for particular attention to any requirement for the holding of the energy signal transmission means stationary or vibration-free, provided that a sufficient energy signal is simultaneously transmitted and effectively received by the complementary signal reception apparatus in both the regions to be mapped. In this way technical requirements will be met.

The described embodiments incorporate twin or dual energy-signal emitters or receivers for the two regions to be mapped and with the provision of, additionally, signal transmission or emission means adapted to transmit a signal between these two systems, as described above, in the step of relative coordinate establishment. It may be said that such a provision of twin or dual energy emitters or receptors (or one of each) amounts to a requirement for additional equipment with respect to a system in which (for example) as described in the WO 99/56146 specification discussed above, a single energy receiver is provided for operation in relation to both mapping regions. However, the answer to this is the enhancement of the performance of the system, whereby both of the regional mapping operations can be conveniently carried out quite independently and in any sequence, and without the annoying requirement to establish an intermediate mapping location establishing an overlap zone between the areas mapped, and indeed without the need to re-position the main energy receptor apparatus after completing one mapping region's operations and before commencing the next. As a result, the modest additional cost associated with additional energy receiver apparatus is significantly outweighed by the advantages perceived by the user of the system.

In an embodiment, there is provided apparatus in which a pair of receiver or emitter assemblies are included in the overall apparatus and, in use, these two assemblies can be used together, one in relation to mapping the underside of a vehicle or other structure, and the other in relation to mapping the corresponding upperside thereof.

During the mapping operations the mapping work can commence with either the underside or the upperside, and such mapping proceeds in the usual way. Then, when it is desired to commence mapping the other side or region of the vehicle or other structure, the following additional step is carried out. The additional step comprises carrying out a mapping or coordinate-establishing energy signal transmission step between the two sets of emitter or receiver apparatus, so that the coordinates of the one (which has just been used for mapping the vehicle or other structure's underside or upperside) can be used as a reference base for establishing the corresponding position co-ordinates of the other set of emitter/receiver apparatus. This is done in an instantaneous and easily carried out step utilizing the transmission of the usual energy signal from or to the two sets of emitter/receiver apparatus by means of an intermediate (complementary receiver or emitter) device acting between the other two sets and serving to provide for the simultaneous sending to each of an energy signal or else the receiving from each of an energy signal for mapping purposes. This top/bottom mapping step can be performed at any time in the overall mapping operations but, of course, after it has been done (and before any additional vehicle mapping steps are carried out), care must be taken not to disturb the thus-mapped receiver or emitter apparatus, so the usual practice will be to carry out the top/bottom mapping step only shortly before commencing the next sequence of vehicle mapping steps, thereby to minimize the likelihood of the accidental introduction of errors arising from mechanical disturbance of the mapped apparatus by personnel.

It is believed that the use of a mapping step carried out between two sets of emitter or receiver apparatus (each capable of carrying out mapping operations with complementary receiver or emitter apparatus) in relation to a vehicle or other structure has not hitherto been needed or carried out because mapping operations are basically carried out using such apparatus in direct (signal transmission) relation to corresponding emitter or receiver apparatus mounted on or touching the vehicle or other structure to be mapped, since such is the essence of mapping operations.

However, it has been determined that significant advantages are obtainable by this approach which permits straight-forward mapping of both the underside and the upperside or other regions of a vehicle or other structure. Such mapping operations can be performed in any sequence (for example with mapping steps alternating between above and below the vehicle) provided that the coordinate transfer step has been carried out before such alternation commences.

Such an arrangement is particularly suitable for automotive crash-repair diagnostics and remedial vehicle-stretching work. In such work, there is a need to be able to quickly determine the effect, both on the vehicle upperside and the underside, of a given degree of vehicle stretching. Moreover, this needs to be able to be performed without tipping the vehicle up, as would be required with the system of previous proposals. Also, because the mapping step carried out between the emitter or receiver apparatus used for mapping the underside and topside of the vehicle (or other structure) can be carried out without the need to mount the immediate signal emitter or receiver apparatus on the vehicle (or other structure), because the coordinates with respect to the vehicle are already known, this top/bottom mapping step can be carried out in a simple, rapid and convenient way on the basis (for example) merely of the user manually holding the intermediate signal reception or transmission apparatus in operative relation to the other two sets of apparatus for energy signal transmission purposes.

Since the energy signal transmission can be performed on the basis of a signal transmission time which is relatively extremely small compared with the time taken to execute motion arising from wobble due to hand-holding of the intermediate signal transmission/reception apparatus, the errors arising from such wobble will be negligible and the expected desirability to mount the intermediate signal transmission/reception apparatus on a stable/fixed mounting is thereby removed and hand-holding of the intermediate signal reception or transmission apparatus is acceptable.

BRIEF DESCRIPTION OF THE DRAWINGS

Embodiments of a mapping system will now be described by way of example with reference to the accompanying drawings, in which.

DETAILED DESCRIPTION

Figure 1:
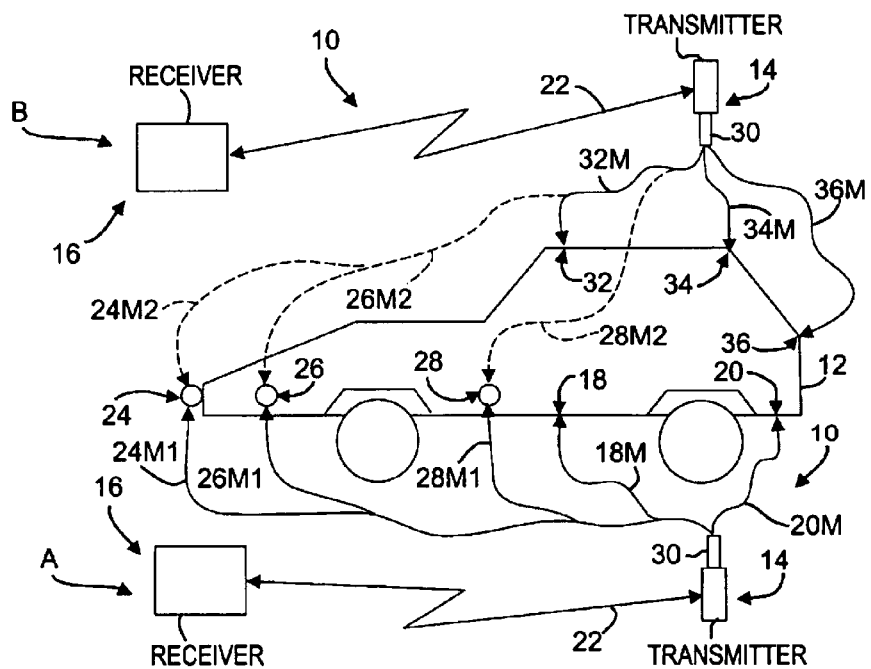
FIG. 1 shows (for convenience of reference) a diagrammatic representation of matters disclosed in the above identified WO 99/56146 specification.

FIG. 1 shows prior-art, three-dimensional mapping apparatus 10, in which a vehicle 12 is mapped using an acoustic transmitter device 14 and a corresponding receiver device 16 together with the usual data processing means (not shown).

In use, transmitter device 14 is caused to map the underside of vehicle 12 at underside locations indicated at 18 and 20 (two locations indicated merely by way of example, though there will usually be significantly more such locations mapped). This is effected by physically engaging the wand portion 30 of the transmitter device 14 sequentially with the vehicle locations to be mapped.

During such mapping operations the acoustic energy signal 22 is transmitted to receiver device 16 from each mapped location for coordinate determination purposes. Those mapping steps are indicated at 18M, 20M.

In order to achieve the subsequent mapping of upperside locations on vehicle 12, the apparatus 10 of FIG. 1 is utilized to identify and map at least three transfer locations 24, 26, 28 which are mapped using transmitter device 14 in the same way as for the underside locations 18 and 20, but taking care to ensure that the attitude of transmitter device 14 is such that the acoustic signal 22 is transmitted to and received by receiver device 16. In simple terms, the wand portion 30 of transmitter device 14 is arranged to be uppermost when mapping the transfer locations 24, 26, 28 in this first sequence of mapping steps of these locations, so that the acoustic signal is readily received by receiver device 16 at its underside location A. These mapping steps are indicated at 24M1, 26M1, and 28M11. It will be noted that the transfer locations 24, 26, 28 are well spaced around the periphery of vehicle 12, including a front location and two side locations in this example.

Having thus mapped the underside of vehicle 12 and at least three transfer locations 24, 26, 28, the mapping operation is extended to the upperside of vehicle 12 in the following manner. First, receiver device 16 is relocated from its position A below the vehicle in FIG. 1 to its position B above the vehicle in FIG. 1, whereupon the transfer locations 24, 26, 28 are re-mapped by engagement of wand portion 30 of transmitter device 14 with those locations, care being taken to ensure that the end portion of the wand is precisely located at the identical location which it adopted in the previous mapping of these locations. However, in this second mapping of these locations the transmitter device should preferably be inverted with respect to its previous attitude so that the acoustic energy signal 22 transmitted from transmitter device 14 to receiver device 16 is properly receivable in the upper position B of the receiver device.

Then, having completed this second mapping operation of the transfer locations 24, 26, 28, (mapping steps 24M2, 26M2 and 28M2), the mapping by steps 32M, 34M, 36M of the upperside locations 32, 34, 36 (and anywhere else that is required on the upperside) can proceed.

It is to be noted that, as indicated above, the exact positioning of the contact end of wand portion 30 of transmitter device 14 in relation to transfer locations 24, 26, 28 is an essential requirement for the accuracy of the vehicle upperside mapping operation in relation to the corresponding vehicle lowerside mapping operation. For this purpose, there is disclosed in the specification of WO 99/56146 details, as disclosed in FIGS. 3A and 3B and 4A and 4B, in relation to the articulated structure of the wand or probe provided for this purpose. It will be appreciated that, in relation to the generally smooth superstructure or body portion of a typical automobile, the precise identification of such somewhat theoretical transfer locations can be a matter of some difficulty.

Figure 2:
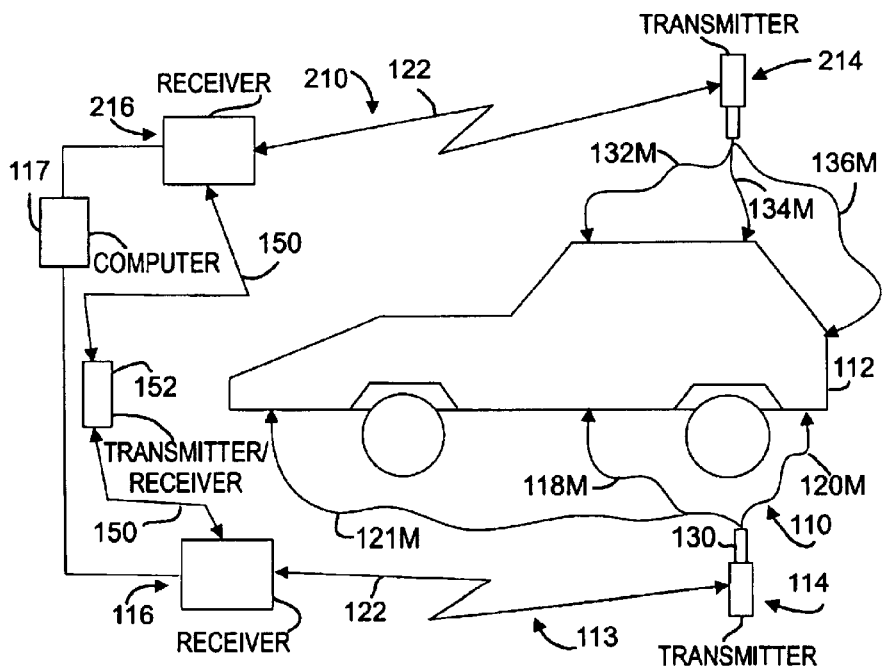
FIG. 2 shows, in a similar format, an embodiment of a mapping system in which the differences from the structure disclosed in FIG. 1 can be clearly identified for reference purposes.

Having thus considered the structure and mode of operation of the prior art in relation to FIG. 1, we now turn to consider the embodiment shown in FIG. 2 of the drawings. In FIG. 2, parts corresponding to those of FIG. 1 are numbered accordingly but with the reference numerals increased by 100. Thus, apparatus 10 of FIG. 1 becomes apparatus 110 etc.

Important distinctions as between apparatus 10 of the prior art in FIG. 1 and apparatus 110 in FIG. 2, include the following. First, although in this embodiment the transmitter 114 and receiver 116 are acoustic devices and disposed in FIG. 2 as indicated, the energy signal may be otherwise than acoustic and the general principles of the embodiments of the invention apply equally to optical and other energy system mapping operations, and indeed to systems in which the energy signal 122 is transmitted in the opposite direction from that shown in FIG. 1, hence the use of the doubleheaded arrow representation for energy signal 122.

Likewise in relation to differences from the prior art of FIG. 1, the embodiment of FIG. 2 does not employ the use of transfer locations corresponding to locations 24, 26, 28 at all. Thus, the mapping steps indicated in FIG. 1 at 24M1, M2 and 26M1, M2 and 28M1, M2 find no counterpart in the embodiment of FIG. 2.

In view of the absence from the embodiment of FIG. 2 of the requirement to map any transfer locations corresponding to the locations 24, 26, 28 in FIG. 1, it will be appreciated that the wand portion 130 of transmitter device 114 in FIG. 2 does not have any requirement for any sophisticated end fitting permitting articulation as is needed in the case of the wand portion 30 of FIG. 1 in view of the twin mapping steps M1, M2 for each of the transfer locations 24, 26, and 28.

In place of the use of these transfer locations, the embodiment of FIG. 2 provides a second set of mapping apparatus 210, including a receiver 216, in addition to the apparatus 110. The apparatus 210 may employ the same transmitter device 114 as the apparatus 110, or additional such devices 214, such choice being dictated by user convenience and cost.

In place, therefore, of the mapping steps at the transfer locations 24, 26, 28, the embodiment of FIG. 2 provides for the transmission of a transfer energy signal 150 between receiver devices 116 and 216, whereby the latter is mapped with respect to the former and thus the mapping steps 132M, 134M, and 136M performed in relation to the upperside of the vehicle become referenced in terms of three-dimensional coordinates with respect to the mapping of the underside of the vehicle. It will be noted in relation to the embodiment of FIG. 2 that the transmission of the transfer energy signal 150 between the receiver devices 116 and 216 is effected by means of a transmitter device 152 adapted simultaneously to emit the acoustic energy signals 150 towards receiver devices 116 and 216 for mapping purposes.

Having thus described the embodiment of FIG. 2 by reference to the prior art of FIG. 1, a systematic description of the embodiment of FIG. 2 will now be provided in terms of the terminology employed for the definition of the subject matter sought to be protected.

Thus, as shown in FIG. 2, apparatus 110 for three-dimensional coordinate determination adapted for crash repair and diagnostics in relation to automotive vehicle 112 and like mapping operations in relation to other articles comprises coordinate data evaluation apparatus 113, including transmitter means 114 and receiver means 116 and data processing computer means 117 adapted to process data derived from the transmission of an energy signal 122 (corresponding to energy signal 22) between the transmitter means 114 and the receiver means 116, to determine information with respect to the three-dimensional coordinates of one (e.g., 114) of the transmitter means 114 and receiver means 116 (positioned at a location such as vehicle underside locations 118, 120 and 121, with respect to the other (e.g., 116) (positioned remotely from said one (e.g., 114) thereof).

Apparatus 110 is employed for carrying out first and second series of coordinate data evaluation steps with the apparatus in relation to first and second regions (e.g., the underside and upperside) of vehicle 112, in each of which series the transmitter means 114 is applied to a series of identifiable or predetermined locations in the relevant one of the regions to be mapped on the vehicle, while the energy signal 122 is transmitted. During these operations the receiver means 116 is located at a defined location relative to vehicle 112 during the series of data evaluation steps.

The steps of carrying out the first and second series of coordinate data evaluation or gathering steps (which are carried out in relation to the underside and the upperside of vehicle 112) are linked in order that the three-dimensional coordinate data is likewise linked or integrated. In this way the mapping of the underside of the vehicle and of the upperside thereof can all be related to the basic vehicle structure, whereby the entire mapping operation is integrated, though carried out in two generally clearly identified portions.

This linking of the two series of data evaluation steps is effected by means of the transmission of the transfer energy signal 150 by means of the transfer energy signal transmitter device 152. In this way the transfer energy signal is transmitted simultaneously to the two receiver devices 116 and 216, which both serve as transfer components which have a defined positional relationship to the vehicle 112. In other words, the transmitter device 152 and the transfer components constitute a transmission means, and the transmission of the energy signal 150 between the transfer components formed by the receiver means 116 and 216 enables the establishment of the relative coordinates of these receiver devices and thus likewise of the regions of the vehicle which they are capable of mapping.

As to the actual positioning of the receiver devices, and the mounting of same, all that is required is (as usual for such operations) that they be in reasonable line of sight for energy signal transmission purposes with the various locations from which the transmitter device 114 is to be located during its two series of mapping operations. Thus, for the purposes of the mapping of the underside of the vehicle it is usually perfectly convenient to locate the receiver device on the support surface or floor on which the vehicle stands, so that the receiver device is generally located approximately centrally of the vehicle and extending lengthwise thereof (if it is of proportions to have a length dimension).

In the case of the receiver means 216 for mapping the upper portion of vehicle 112, the requirement for a stable mounting which is of fixed position during the procedure of establishing its three-dimensional coordinates with respect to the receiver device 116 which operates in relation to the lower region of vehicle 112, is met by, for example, providing a simple floor-standing mounting or stand or standard (not shown) on which receiver device 216 is mounted.

Whereas in the case of the receiver device 116 for the lower portion of the vehicle, it is preferred to provide a lengthwise-extended receiver device having (in the case of an acoustic-based energy system) multiple microphones at each side of a lengthwise-extending beam structure, which is allowed in use to rest on the vehicle support surface and extending generally in the fore/aft direction of the vehicle, such is usually not needed for mapping the upperside of the vehicle. It is therefore usually sufficient for the upper receiver device 216 to be of relatively modest dimensions with a corresponding modest number of receiver devices appropriately mounted and positioned (in terms of attitude).

It will be understood that the need for the position of the receiver devices 116 and 216 to be fixed throughout the entire mapping operation is not a hard-and-fast requirement. All that is actually needed is that each receiver device be in a fixed position at least during the first few (or a minimum of one) of its mapping operations. Then, it can be re-indexed with respect to the vehicle if by accident it is moved or needs to be moved, though such will not usually be the case.

In this embodiment, the intermediate transmitter device 152 serves effectively to link the receiver devices 116 and 216. In a modification in which the direction of energy transmission is reversed, the intermediate transmitter device 152 would, of course, be a receiver device serving to receive energy signals from transfer components including transmitter devices corresponding to, or included in, receiver devices 116 and 216. In this way, regardless of the actual direction of energy transmission the system can determine the geometry of, and hence the three-dimensional coordinates of, the locations representing the ends of the energy transmission paths. In this modification the reversal of the energy transmission direction may necessitate complementary modifications in the coordinate data evaluation apparatus 113 which serves to compute the coordinates from (in the case of the embodiment of FIG. 2 and this modification) the acoustic signal time transmission data determined from the transmitter and receiver devices of the embodiments, but such is well within the competence of the skilled person familiar with three-dimensional mapping systems of this kind and as disclosed in the above-discussed published WO 0056146 specification.

It may not be necessary for there to be provided an intermediate energy transmission or energy receiver device corresponding to device 152 in FIG. 2 for all embodiments of the invention since, if one of the receivers 116, 216 were a transmitter device, the energy signal 150 could be transmitted without an intermediate device and the transmission means would include only the transfer components of the two sets of mapping apparatus. In such an arrangement the two sets of mapping apparatus (for the two mapping regions) would differ in their directions of signal transmission, but such presents no insuperable difficulty. Usually however it will be more convenient to provide an intermediate signal transmission or receptor device, since this enables the energy signal transmission path to pass around obstructions more effectively.

Where device 152 in FIG. 2 is provided, then it is not necessary for both parts of energy signal 150 to be transmitted simultaneously, provided that device 152 is fixed in position between such transmissions, or at least is at positions of known co-ordinates. Where simultaneous transmission occurs, device 152 can be hand-held.

In the embodiments, the two regions of an article to be mapped will usually be entirely separate, since the overlap of the regions to some extent removes the strict need for a linking mapping operation to be performed. However, in some cases it may still prove more convenient to carry out the linking or transfer mapping step in accordance with the embodiments of the invention, since such is of short duration and relatively straightforward.

What is claimed is:

1. A method of three-dimensional coordinate determination adapted for mapping operations in relation to vehicles, the method comprising:

carrying out first and second series of coordinate data evaluation steps employing two sets of coordinate data evaluation apparatus respectively in relation to first and second regions of a vehicle, and transmitting an energy signal establishing the relative coordinates of the regions, the energy signal being transmitted between transfer components forming respective parts of the two sets of apparatus, the energy signal being transmitted while each of the transfer components is in a defined positional relationship to its respective one of the first and second regions of the vehicle.

2. A method according to claim 1, wherein the transmitting of the energy signal establishing the relative coordinates of the regions is effected via an intermediate transmitter or receiver disposed between the transfer components of the two sets of apparatus.

3. A method according to claim 2, wherein both of the transfer components receive an energy signal transmitted by an intermediate transmitter.

4. A method according to claim 3, wherein the intermediate transmitter emits energy signals simultaneously to both transfer components.

5. A method according to claim 4, wherein the intermediate transmitter is hand held.

6. A method according to claim 3, wherein the intermediate transmitter emits energy signals non-simultaneously to both receiver means.

7. The method according to claim 2, wherein both of the transfer components transmit an energy signal to an intermediate receiver.

8. The method according to claim 7, wherein both of the transfer components emit energy signals simultaneously to the intermediate receiver.

9. A method according to claim 8, wherein the intermediate receiver is hand held.

10. A method according to claim 7, wherein the transfer components emit energy signals non-simultaneously to the intermediate receiver.

11. Apparatus for three-dimensional coordinate determination adapted for mapping operations in relation to vehicles, the apparatus comprising:

first and second sets of coordinate data evaluation apparatus for respectively carrying out first and second series of coordinate data evaluation steps respectively in relation to first and second regions of a vehicle; and transmission means for the transmission of an energy signal, establishing the relative coordinates of the regions, between the first and second sets, the transmission means including transfer components respectively included in the sets and each disposed in a defined positional relationship to its respective one of the first and second regions of the vehicle during transmission of the energy signal.

12. Apparatus according to claim 11, wherein the transmission means includes an intermediate transmitter or receiver between the transfer components and in communication with each.

13. Apparatus according to claim 12, wherein both of said the transfer components are energy signal receiver means and the intermediate transmitter or receiver means is an energy signal emitter means adapted to emit energy signals to both such receiver means.

14. Apparatus according to claim 12, wherein both of the transfer components are energy signal emitter means and the intermediate transmitter or receiver means is an energy signal receiver means adapted to receive energy signals from both such emitter means.

15. Apparatus according to claim 12, wherein the intermediate transmitter or receiver is a hand-held device.

* * * * *